(12) United States Patent
Englund

(10) Patent No.: US 9,212,948 B2
(45) Date of Patent: Dec. 15, 2015

(54) LOSSLESS HYPERSPECTRAL IMAGING

(71) Applicant: The Trustees of Columbia University in the City of New York, New York, NY (US)

(72) Inventor: Dirk R. Englund, New York, NY (US)

(73) Assignee: The Trustees Of Columbia University In The City Of New York, New York, NY (US)

( * ) Notice: Subject to any disclaimer, the term of this patent is extended or adjusted under 35 U.S.C. 154(b) by 0 days.

(21) Appl. No.: 14/074,554

(22) Filed: Nov. 7, 2013

(65) Prior Publication Data

US 2014/0233028 A1    Aug. 21, 2014

Related U.S. Application Data

(60) Provisional application No. 61/723,487, filed on Nov. 7, 2012.

(51) Int. Cl.
| | | |
|---|---|---|
| *G01J 3/28* | (2006.01) | |
| *G01J 3/433* | (2006.01) | |
| *G01J 3/02* | (2006.01) | |

(52) U.S. Cl.
CPC .............. *G01J 3/2823* (2013.01); *G01J 3/0218* (2013.01); *G01J 3/0229* (2013.01); *G01J 3/433* (2013.01)

(58) Field of Classification Search
CPC .................. G01J 3/02; G01J 3/18; G01J 3/28; G01J 3/2803; G01J 3/2823
USPC .................................................. 356/300–334
See application file for complete search history.

(56) References Cited

U.S. PATENT DOCUMENTS

| | | |
|---|---|---|
| 4,717,255 A | 1/1988 | Ulbers |
| 5,431,055 A | 7/1995 | Takata et al. |
| 5,455,421 A | 10/1995 | Spears |
| 5,493,393 A | 2/1996 | Beranek et al. |
| 5,565,987 A | 10/1996 | Jain et al. |
| 5,760,939 A | 6/1998 | Nagarajan et al. |

(Continued)

FOREIGN PATENT DOCUMENTS

| | | |
|---|---|---|
| EP | 1 432 048 | 6/2004 |
| WO | WO 2010/141114 | 12/2010 |
| WO | WO 2011/046875 | 4/2011 |
| WO | WO 2011/089119 | 7/2011 |
| WO | WO 2012/115793 | 8/2012 |
| WO | WO 2012/128943 | 9/2012 |

OTHER PUBLICATIONS

U.S. Appl. No. 14/253,250, filed Apr. 15, 2014.
U.S. Appl. No. 14/501,735, filed Sep. 30, 2014.
International Search Report and Written Opinion for PCT/US13/073613, dated May 30, 2014.

(Continued)

*Primary Examiner* — Abdullahi Nur
(74) *Attorney, Agent, or Firm* — Baker Botts L.L.P.

(57) ABSTRACT

Techniques for hyperspectral imaging using a spatial light modulator having a plurality of pixels, including encoding electromagnetic radiation incident a first pixel at a first location and a second pixel at a second location into a first modulated signal having a first modulation frequency and a second modulated signal having a second modulation frequency, the first modulation frequency being different than the second modulation frequency. A sum of intensities of at least the first modulated signal and the second modulated signal is measured at a plurality of optical frequencies and a transform is applied to the sum to obtain an intensity of electromagnetic radiation incident each of the first location and the second location for each of the plurality of optical frequencies.

14 Claims, 4 Drawing Sheets

Setup.

(56) References Cited

U.S. PATENT DOCUMENTS

| | | | |
|---|---|---|---|
| 6,069,645 A | 5/2000 | Vincent | |
| 6,157,042 A | 12/2000 | Dodd | |
| 6,512,866 B1 | 1/2003 | Fan et al. | |
| 6,584,126 B2 | 6/2003 | Wang et al. | |
| 6,614,533 B1 | 9/2003 | Hata | |
| 6,752,008 B1 | 6/2004 | Kley | |
| 7,091,500 B2 | 8/2006 | Schnitzer | |
| 7,184,642 B2 | 2/2007 | Hoshi et al. | |
| 7,347,085 B2 | 3/2008 | Taber | |
| 7,356,225 B2 | 4/2008 | Loebel | |
| 7,359,111 B1 | 4/2008 | Bratkovski | |
| 7,406,860 B2 | 8/2008 | Zhou et al. | |
| 7,474,811 B1 | 1/2009 | Quitoriano et al. | |
| 7,572,648 B2 | 8/2009 | Suzuki et al. | |
| 7,592,632 B2 | 9/2009 | Takagi | |
| 7,599,061 B1 | 10/2009 | Ting et al. | |
| 7,659,536 B2 | 2/2010 | Krishna et al. | |
| 7,817,274 B2 | 10/2010 | Zhang | |
| 8,053,782 B2 | 11/2011 | Avouris et al. | |
| 8,116,624 B1 | 2/2012 | Wach | |
| 8,189,302 B2 | 5/2012 | Gurney et al. | |
| 8,213,751 B1 | 7/2012 | Ho et al. | |
| 8,263,986 B2 | 9/2012 | Hajj-Hassan et al. | |
| 2001/0055147 A1 | 12/2001 | Little et al. | |
| 2003/0020926 A1 | 1/2003 | Miron | |
| 2004/0150873 A1 | 8/2004 | Pearsall | |
| 2004/0156610 A1 | 8/2004 | Charlton et al. | |
| 2004/0179803 A1 | 9/2004 | Bourelle | |
| 2005/0110992 A1 | 5/2005 | Scherer et al. | |
| 2005/0218328 A1 | 10/2005 | Suzuki et al. | |
| 2006/0058685 A1 | 3/2006 | Fomitchov et al. | |
| 2006/0092414 A1* | 5/2006 | Geshwind et al. | 356/310 |
| 2006/0188721 A1 | 8/2006 | Irvin et al. | |
| 2006/0283338 A1 | 12/2006 | Degertekin | |
| 2007/0020144 A1 | 1/2007 | Du et al. | |
| 2007/0107501 A1 | 5/2007 | Taber | |
| 2008/0089367 A1 | 4/2008 | Srinivasan et al. | |
| 2008/0159679 A1 | 7/2008 | Sigalas et al. | |
| 2008/0223119 A1 | 9/2008 | Phan et al. | |
| 2009/0015757 A1 | 1/2009 | Potts et al. | |
| 2009/0237666 A1 | 9/2009 | Vollmer et al. | |
| 2009/0273779 A1 | 11/2009 | Baumberg et al. | |
| 2010/0014077 A1 | 1/2010 | Khetani et al. | |
| 2010/0117647 A1 | 5/2010 | Madore | |
| 2010/0142569 A1 | 6/2010 | Magel | |
| 2010/0176200 A1 | 7/2010 | Vollmer et al. | |
| 2010/0202035 A1 | 8/2010 | Noh et al. | |
| 2010/0275334 A1 | 10/2010 | Proksch et al. | |
| 2011/0042650 A1 | 2/2011 | Avouris et al. | |
| 2011/0149296 A1 | 6/2011 | Tearney et al. | |
| 2011/0151602 A1 | 6/2011 | Speier | |
| 2011/0158268 A1 | 6/2011 | Song | |
| 2011/0175060 A1 | 7/2011 | Okai et al. | |
| 2011/0269259 A1 | 11/2011 | Tatani et al. | |
| 2011/0280263 A1 | 11/2011 | Kieu et al. | |
| 2012/0039344 A1 | 2/2012 | Kian et al. | |
| 2012/0044489 A1 | 2/2012 | Chakravarty et al. | |
| 2012/0045169 A1 | 2/2012 | Hu et al. | |
| 2012/0069338 A1 | 3/2012 | Afzali et al. | |
| 2012/0219250 A1 | 8/2012 | Ren et al. | |
| 2012/0268745 A1 | 10/2012 | Kudenov et al. | |
| 2014/0160336 A1 | 6/2014 | Englund et al. | |
| 2014/0196179 A1 | 7/2014 | Englund et al. | |

OTHER PUBLICATIONS

International Search Report and Written Opinion for PCT/US13/032373, dated Jun. 13, 2013.
International Search Report and Written Opinion for PCT/US13/052020, dated Dec. 20, 2013.
International Search Report and Written Opinion for PCT/US13/031736, dated Oct. 29, 2013.
International Search Report and Written Opinion for PCT/US12/048837, dated Dec. 27, 2012.
International Search Report and Written Opinion for PCT/US12/048833, dated Apr. 5, 2013.
International Search Report and Written Opinion for PCT/US12/061126, dated Jan. 10, 2013.
Andryieuski et al., "Nanocouplers for infrared and visible light", *Advances in OptoElectronics*. Retrieved from the Internet: URL:http://arvix.org/ftp/arvix/papers/1206/1206.6601.pdf (32 pages) (2012).
Ban et al., "Near-infrared to visible light optical upconversion by direct tandem integration of organic light-emitting diode and inorganic photodetector", *Applied Physics Letters*, 90:093108 (2007).
Bao et al., "Graphene photonics, plasmonics, and broadband optoelectronic devices", *ACS Nano*, 6(5):3677-3694 (2012).
Bonaccorso et al., "Graphene photonics and optoelectronics", *Nature Photonics*, 4:611-622 (2010).
Boriskina et al., "Spectrally engineered photonic molecules as optical sensors with enhanced sensitivity: a proposal and numerical analysis", *JOSA B*, 23(8):1565-1573 (2006).
Bullis, "Graphene Transistors", *MIT Technology Review*, (Jan. 28, 2008); Retrieved from http://www.technologyreview.com/news/409449/graphene-transistors/ [downloaded on Oct. 23, 2014].
Butler et al., Nomenclature, symbols, units and their usage in spectrochemical analysis-IX. Instrumentation for the spectral dispersion and isolation of optical radiation (IUPAC Recommendations 1995), *Pure and Applied Chemistry*, 67(10):1725-1744 (1995).
Craven-Jones et al., "Infrared hyperspectral imaging polarimeter using birefringent prisms", *Appl. Opt.*, 50(8):1170-1185 (2011).
DeCorby et al., "Chip-scale spectrometry based on tapered hollow Bragg waveguides", *Optic Express*, 17(19):16632-16645 (2009).
Fang et al., "Graphene-antenna sandwich photodetector", *Nano Letters*, 12(7):3808-3813 (2012).
Furchi et al., "Microactivity-integrated grapheme photodetector", *Nano Letters*, 12(6):2773-2777 (2012).
Gan et al., "A high-resolution spectrometer based on a compact planar two dimensional photonic crystal cavity array", *Applied Physics Letters*, 100:231104 (4 pages) (2012).
Geim et al., "The rise of grapheme", *Nature Materials*, 6(3):183-191 (2007).
Huang et al., "Study of residual background carriers in midinfrared In As/Ga Sb superlattices for uncooled detector operation", *Applied Physics Letters*, 92:071102 (2008).
Ismail et al., "Raman spectroscopy with an integrated arrayed-waveguide grating", *Optic Letters*, 36(23):4629-4631 (2011).
Jelezko et al., "Read-out of single spins by optical spectroscopy", *Journal of Physics: Condensed Matter*, 16:R1089-R1104 (2004).
Kim et al., "Graphene-based plasmonic waveguides for photonic integrated circuits", *Optics Express*, 19(24):24557-24562 (2011).
Kuzmenko et al., "Universal optical conductance of graphite", *Phys. Rev. Lett.*, 100(11):117401 (2008).
Lidstone et al., "Label-free imaging of cell attachment with photonic crystal enhanced microscopy", *Analyst*, 136(18):3608-3615 (2011).
Liu et al., "A graphene-based broadband optical modulator", *Nature*, 474(7349):64-67 (2011).
Lu et al., "Nanoscale graphene electro-optic modulators based on graphene-slot waveguides", *JOSA B*, 29(6):1490-1496 (2012).
Makhlouf et al., "Multispectral confocal microendoscope for in vivo and in situ imaging", *Journal of Biomedical Optics*, 13(4):044016 (2008).
Pisani et al., "Compact imaging spectrometer combining fourier transform spectroscopy with a Fabry-Perot interferometer", *Optics Express*, 17(10):8319-8331 (2009).
Sarkissian et al., "Spectroscopy of a tapered-fiber photonic crystal waveguide coupler", *Optics Express*, 17(13):10738-10747 (2009).
Sheilds et al., "A scanning cavity nanoscope", $41^{st}$ *Annual Meeting of the APS Division of Atomic Molecular and Optical Physics*, 55(5), Tuesday-Saturday, May 25-29, 2010, Houston, Texas.
Tsuji et al., "An efficient and compact difference-frequency-generation spectrometer and its application to $^{12}CH_3D/^{12}CH_4$ isotope ratio measurements", *Sensors (Basel)*, 10(7):6612-6622 (2010).
Wang et al., "Graphene on SiC as a Q-switcher for a 2 μm laser", *Optics Letters*, 37(3):395-397 (2012).
Xia et al., "Ultrafast graphene photodetector", *Nature Nanotechnology*, 4(12):839-843 (2009).

* cited by examiner

Setup.

LOSSLESS HYPERSPECTRAL IMAGING

CROSS-REFERENCE TO RELATED APPLICATIONS

This application claims priority to U.S. Provisional Application No. 61/723,487, filed on Nov. 7, 2012, which is hereby incorporated by reference in its entirety.

STATEMENT OF FEDERALLY SPONSORED RESEARCH OR DEVELOPMENT

This invention was made with government support under the DARPA Information in a Photon program, through grant No. W911NF-10-1-0416, awarded by the Army Research Office. The government has certain rights in the invention.

BACKGROUND

The disclosed subject matter relates to techniques for hyperspectral imaging.

Spectral imaging generally involves the collection and processing of information across the electromagnetic spectrum, which can provide a more detailed representation of a scene compared to what is visible to the human eye. Different materials absorb and emit electromagnetic radiation in different manners, and this spectrum can serve as a "fingerprint" for a particular material, helping to identify it from others. The ability to visualize multiple frequencies of the spectrum can permit the material composition of an imaged region to be deduced and, with adequate post-processing, can provide detailed information about the material composition of the environment or sample. As a result, hyperspectral imagers can be used for spectroscopic identification of solids, gasses, and liquids—such as biological agents, types of polymers, exhaust fumes, and the like.

One aspect of the design of hyperspectral imaging techniques concerns how to efficiently record and transmit hyperspectral images. In general, certain approaches to hyperspectral imaging can include obtaining the intensity $I(x,y,v,t)$ of a scene in the $(x,y)$ plane at frequency $v$ of an electromagnetic spectrum at a time $t$. In common hyperspectral imagers, a two-dimensional slice is acquired at a time. For instance, a spectrometer can be used to acquire the spectrum across a slice along the x-axis; then, this acquisition is repeated in time while scanning across the other dimension, y. Another method is to instantaneously record $I(x,y,t)$ and then sweep over the last dimension $v$; however, only a single spectral component $v$ is acquired at any given time, while the remaining spectral components are rejected. In connection with each of these general approaches, some information is lost since not all dimensions $(x,y,v,t)$ are recorded simultaneously. Thus, in these hyperspectral imagers, only a slice in parameter space is imaged at a time, while the remaining information is rejected or lost. In another technique, a scanning interferometer is used to acquire a hyperspectral image by Fourier transform interferometry; however, this requires a complex setup with a scanning interferometer path, which can make the method slow and the apparatus complex and large.

Certain hyperspectral imaging techniques attempt to address the tradeoff between spatial and spectral resolution. For example, interferometric techniques can be used to spread the spectra onto a multiple pixels and/or the pixels can be arranged in a two-dimensional array such that some pixels record spectral information and others record spatial information. However, such techniques can still involve some concession of spectral resolution for spatial resolution, and further can be limited in acquisition rate (frame rate) because a greater number of total pixels is required. Accordingly, there is a desire for hyperspectral imaging techniques that allow for both high spatial resolution and high spectral resolution at a high frame rate, while also optimizing photon throughput (i.e., not rejecting light).

SUMMARY

The disclosed subject matter provides techniques for hyperspectral imaging. As disclosed herein, multiple spectral and spatial components can be simultaneously recorded, improving acquisition speed and signal-to-noise ratio.

In one aspect of the disclosed subject matter, a system for hyperspectral imaging includes a spatial light modulator having a plurality of pixels. A first pixel at a first location can encode electromagnetic radiation incident the first location into a first modulated signal having a first modulation frequency. At least a second pixel at a second location can encode electromagnetic radiation incident the second location into a second modulated signal having a second modulation frequency different from the first modulation frequency. One or more optical elements can couple at least the first modulated signal and the second modulated signal into an optical demultiplexer adapted to measure a sum of intensities of at least the first modulated signal and the second modulated signal at a plurality of optical frequencies. One or more processors can apply a transform to the sum and obtain an intensity of electromagnetic radiation incident each of the first location and the second location for each of the plurality of optical frequencies.

In accordance with exemplary embodiment of the disclosed subject matter, the spatial light modulator can encode electromagnetic radiation incident on each of the plurality of pixels using one or more of electro-optic modulation, acousto-optic modulation, magneto-optic modulation, or opto-mechanic modulation. The spatial light modulator can include a digital micromirror device, with each of the plurality of pixels including one or more mirrors, coupled to a control unit adapted to electrostatically actuate the one or more mirrors. The first pixel can be electrostatically actuated at the first modulation frequency and the second pixel is electrostatically actuated at the second modulation frequency, and so forth.

In accordance with exemplary embodiment of the disclosed subject matter, the plurality of pixels of the spatial light modulator can be arranged in a two dimensional array. The one or more optical elements can include a multi-mode fiber adapted to transmit at least the first modulated signal and the second modulated signal to the optical demultiplexer. The demultiplexer can include a plurality of detectors, each detector corresponding to one of the plurality of optical frequencies.

In another aspect of the disclosed subject matter, methods for hyperspectral imaging using a spatial light modulator are provided. An exemplary method includes encoding electromagnetic radiation incident on a first pixel at a first location into a first modulated signal having a first modulation frequency, and electromagnetic radiation incident on a second pixel at a second location into a second modulated signal having a second modulation frequency, where the first modulation frequency being different than the second modulation frequency. A sum of intensities of at least the first modulated signal and the second modulated signal can be measured at a plurality of optical frequencies. A transform can be applied to the sum to obtain an intensity of electromagnetic radiation incident each of the first location and the second location for each of the plurality of optical frequencies.

In accordance with exemplary embodiment of the disclosed subject matter, a method for hyperspectral imaging can further include encoding electromagnetic radiation incident each of the plurality of pixels using one or more of electro-optic modulation, acousto-optic modulation, magneto-optic modulation, or opto-mechanic modulation. It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

Figure 1:
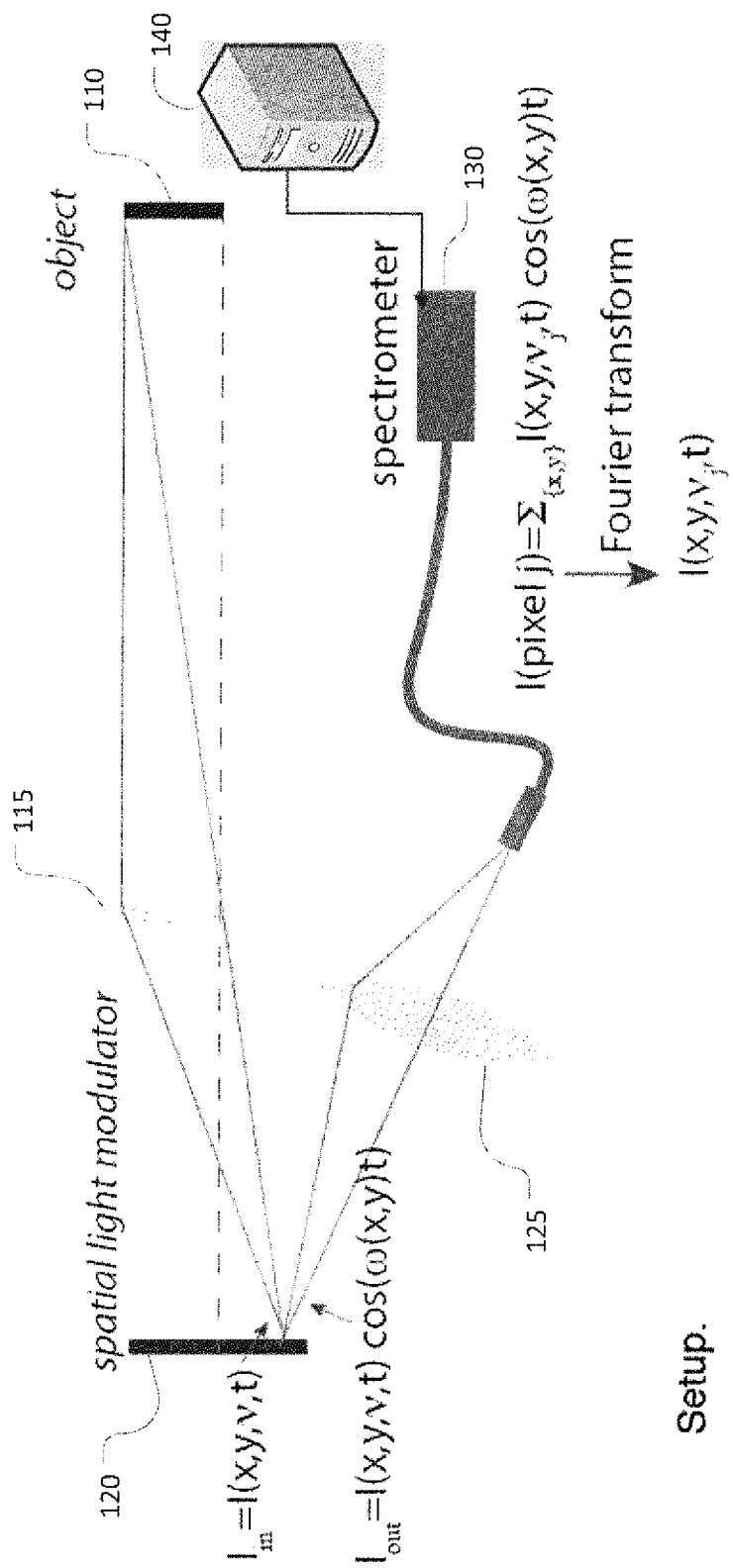
FIG. 1 depicts a system for hyperspectral imaging in accordance with an exemplary embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

As disclosed herein, techniques for hyperspectral imaging can enable the recording of all spectral and spatial components of a scene simultaneously. As used herein, a "scene" can refer to the projected image of an object or environment onto a plane using one or more optical elements. In accordance with the disclosed subject matter, a scene can be projected onto a spatial light modulator ("SLM") having an array of pixels adapted to modulate the amplitude of incident electromagnetic radiation differently at each pixel. The electromagnetic radiation reflected or transmitted by each the pixels (which can be referred to herein as having been encoded into a modulated signal) can coupled into an optical demultiplexer (such as a spectrometer). The optical demultiplexer can be adapted to measure a sum of intensities of the modulated signals at a plurality of frequency components, and a Fourier transform in the frequency regime of the spatial light modulator range can be applied to obtain intensity coefficients for each pixel location at each frequency component.

The accompanying figures serve to further illustrate various embodiments and to explain various principles and advantages all in accordance with the disclosed subject matter. For purpose of illustration, and not limitation, exemplary embodiments of the disclosed subject matter will now be described with reference to FIGS. 1-4.

Figure 2A:
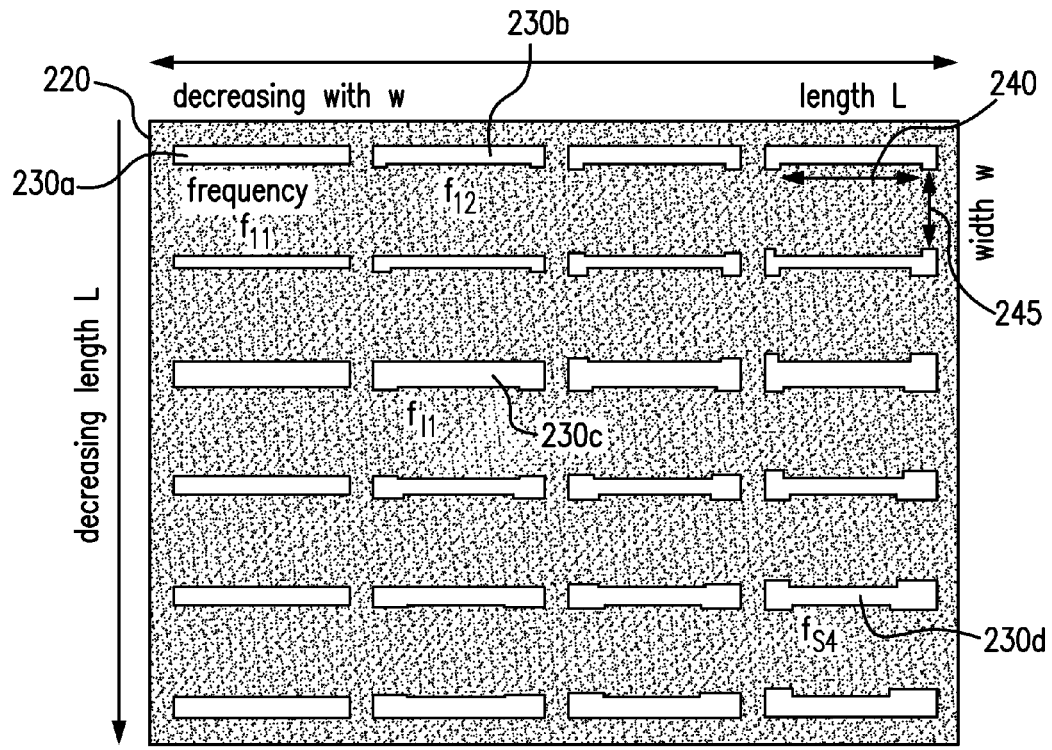
FIG. 2A depicts a top view of a silicon chip with an array of opto-mechanical modulators at unique frequencies $\omega(x,y)$ in accordance with an exemplary embodiment of the disclosed subject matter.
Figure 2B:
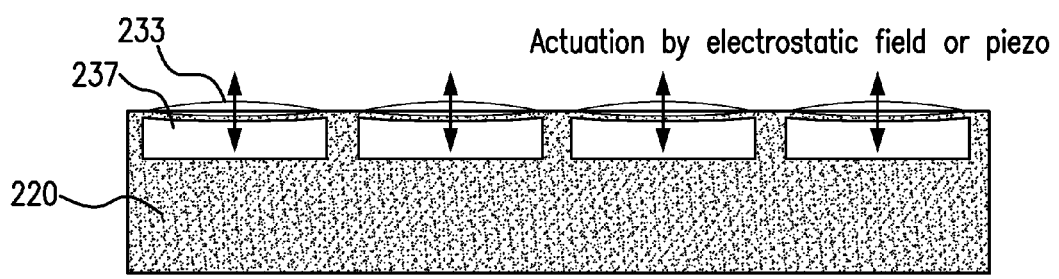
FIG. 2B depicts a side view of a silicon chip with an array of opto-mechanical modulators at unique frequencies $\omega(x,y)$ in accordance with an exemplary embodiment of the disclosed subject matter.

With reference to FIG. 1 and FIG. 2A, and in accordance with an exemplary embodiment of the disclosed subject matter, a system for hyperspectral imaging can include a spatial light modulator 120, 220 having a plurality of pixels (e.g., 230a, 230b, 230c, 230d, collectively, 230). A first pixel 230a at a first location can be adapted to encode electromagnetic radiation incident the first location into a first modulated signal having a first modulation frequency. At least a second pixel 230b at a second location can be adapted to encode electromagnetic radiation incident the second location into a second modulated signal having a second modulation frequency different from the first modulation frequency. One or more optical elements 125 can be arranged to couple at least the first modulated signal and the second modulated signal into an optical demultiplexer 130 adapted to measure a sum of intensities of at least the first modulated signal and the second modulated signal at a plurality of optical frequencies. One or more processors 140, operatively coupled to the demultiplexer 130, can be configured to apply a transform to the sum and obtain an intensity of electromagnetic radiation incident each of the first location and the second location for each of the plurality of optical frequencies.

In an exemplary embodiment, a system for hyperspectral imaging can include one or more optical elements 115 to focus electromagnetic radiation from an object 110 to be imaged onto the spatial light modulator 120. One of ordinary skill in the art will appreciate that the optical elements 115 can include conventional dispersive elements, such as lenses or the like, to project a scene including the object 110 onto the spatial light modulator 120.

As embodied herein, the spatial light modulator 120 can be adapted to encode electromagnetic radiation incident on each of the plurality of pixels using one or more of electro-optic modulation, acousto-optic modulation, magneto-optic modulation, or opto-mechanic modulation. For example, FIG. 2A depicts a spatial light modulator 220 including an array of opto-mechanical modulators (e.g., 230) having varying dimensions each adapted to modulate incident light at a different frequency. With reference to FIG. 2A, each pixel can correspond to a modulator and can have dimensions given by the width 240 of the modulators and the distance between the modulators 245. For purpose of illustration, and not limitation, the dimensions of each pixel can be approximately 10 micron by 10 micron. A 128×128 imaging array can therefore have dimensions of approximately millimeter scale.

In accordance with exemplary embodiment of the disclosed subject matter, the plurality of pixels of the spatial light modulator 120 can be arranged in a two dimensional array. For example, the spatial light modulator can include a digital micromirror device (DMD), with each of the plurality of pixels including one or more mirrors, coupled to a control unit adapted to electrostatically actuate the one or more mirrors. For example, with reference to FIG. 2B, the first pixel (e.g., 237) can be electrostatically actuated (233) at the first modulation frequency and the second pixel is electrostatically actuated at the second modulation frequency. In accordance with an exemplary embodiment, the modulation frequencies of the pixels can be in the MHZ to GHz regime (i.e., smaller than the optical frequency being measured).

To modulate DMD pixels (mirrors) at the range of frequencies of this exemplary embodiment, the resonance frequencies of the individual mirrors can be controlled via the mirror mass or spring constants as depicted in FIG. 2. An electrostatic actuation with wide enough bandwidth can then be applied to groups of mirrors to set them in motion in their resonances. In connection with the disclosed subject matter, the mirrors of the DMD can be oscillating continuously at their resonant frequency, which means that no information is required to be sent to the mirrors; instead, each mirror can have its own oscillation that only needs to be driven through DC power distribution. Instead of electro-static actuation, the DMD array can also be excited using a piezoelectric device or crystal oscillator that actuates the entire DMD chip, as long as the drive bandwidth is large enough to excite all resonators. The bandwidth $\delta\omega$ per oscillator can be controlled by the loss of that oscillator. For example, the bandwidth can be given by $\delta\omega=\omega/Q$, where $\omega$ is the resonance frequency of the modulator and Q is its quality factor. $\delta\omega$ increases with resonator loss rate, such as mechanical losses of the resonator material, or losses at the anchor points of the cantilever ("clamping losses").

For purpose of illustration, and not limitation, the exemplary embodiment depicted in FIG. 1 can include amplitude modulation of the form $\cos(\omega(x,y) t)$ for each pixel (x,y) 230, where $\omega$ is the modulation frequency. In this embodiment, all frequencies $\omega(x,y)$ are unique to pixels (x,y) 230. The electromagnetic incident on each pixel can thus be given by $I_{in} = I(x,y,v,t)$, where v is the frequency of the electromagnetic radiation. The frequency of the electromagnetic radiation, v, can be referred to as the "optical frequency." However, this notation is not intended to limit to the visible spectrum, but rather all frequency components of interest for a particular application, which can include ultraviolet and infrared frequencies as well. In this illustrative embodiment, the frequencies $\omega(x,y)$ can be in the MHz to GHz regime, i.e., smaller than the optical frequency v.

Figure 4:
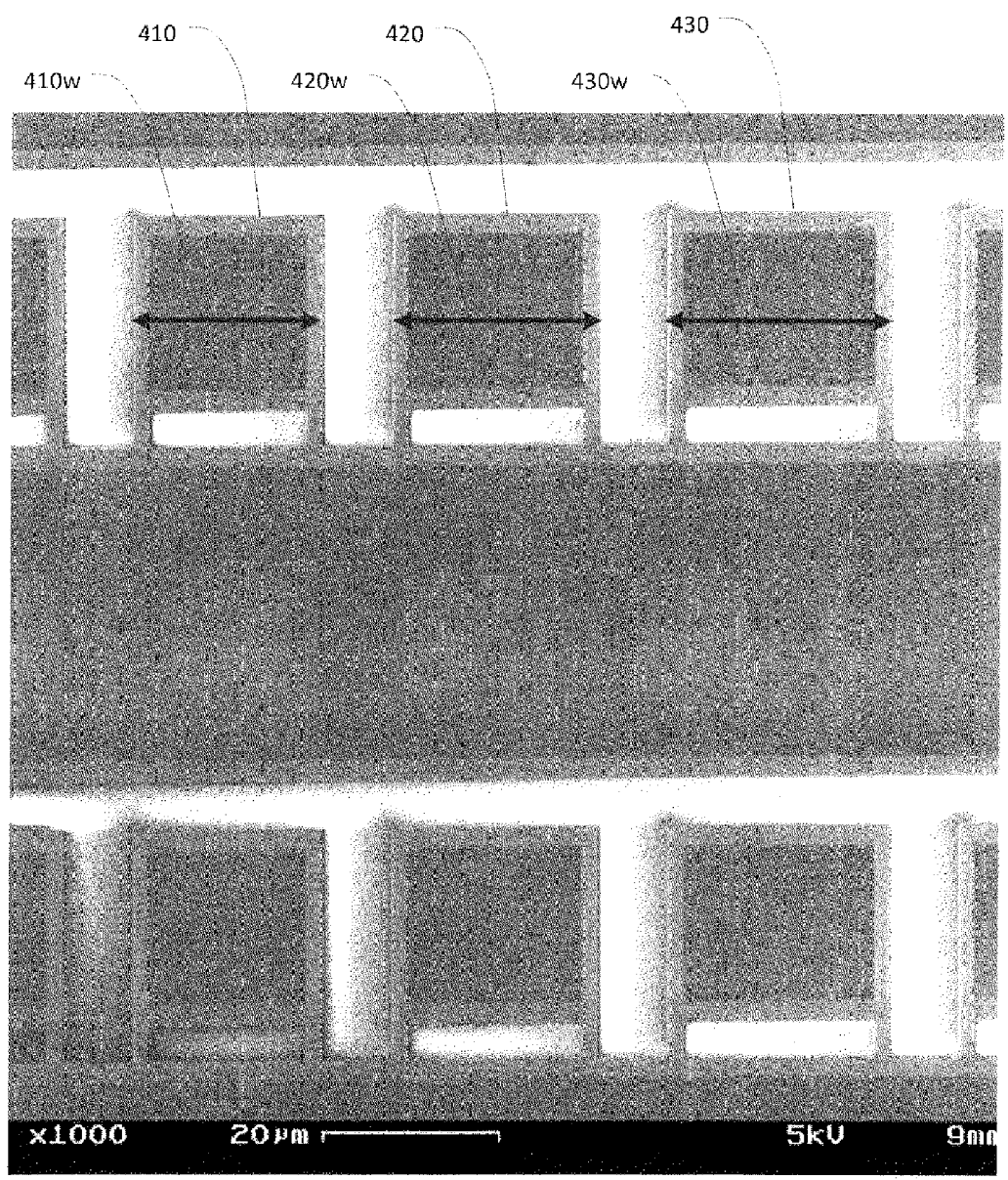
FIG. 4 is a scanning electron microscope image of a silicon chip with an array of opto-mechanical modulators in accordance with an exemplary embodiment of the disclosed subject matter.

FIG. 4 depicts a scanning electron microscope ("SEM") image of another exemplary spatial light modulator array in accordance with the disclosed subject matter. In this exemplary and non-limiting embodiment, a plurality of pixels (e.g., 410, 420, and 430) can be arranged in a grid. Each pixel can include a reflective surface and can be driven by electrostatic or piezoelectric actuation. For purpose of illustration, and not limitation, in the case of high-Q cantilever-based modulators, a broad-band excitation of the full chip can modulate the cantilevers. Each cantilever can effectively be its own clock which can be excited by a broad-band actuator applied to the entire chip. Alternatively, each cantilever can be controlled with a feedback loop applied to an electrostatic actuation mechanism. In this manner, each cantilever can represent a self-driven oscillator which resonates at a frequency that is different from the other cantilevers. In an exemplary embodiment, each pixel can be coated with a reflective material, such as gold, to enhance reflectivity.

Each pixel can have a different dimension such that when light incident each pixel can be modulated at a different frequency. For example, pixel 410 can have width 410w, pixel 420 can have width 420w, and pixel 430 can have width 430w. As illustrated by FIG. 4 each pixel can include a cantilever with a unique resonance frequency; these modulators can be driven simultaneously by means of electrostatic actuation or by broadband piezoelectric actuation of the entire chip. High-Q resonances of these cantilevers can imply that they encode unique modulation frequencies with less than 1% overlap between different cantilevers. The cantilevers can act as deflecting mirrors, which therefore modulate the reflected light as in a digital light processing (DLP) element based on micro-mirror arrays.

As disclosed herein, the modulated signals from at least a subset of the pixels can be coupled into an optical demultiplexer 130 using one or more optical elements 125. The ability to send an image with full spectral information through an optical fiber can enable the image to be transferred across long distances (spectral dispersion is not as important here as certain standard optical communications because the modulation of the signals is only on the scale of hundreds of MHz). Alternatively, the full image can be translated optically through a thin fiber, as in endoscopy.

In an exemplary embodiment, the modulated signals are reflected from each pixel and coupled into optical demultiplexer 130 using a multi-mode fiber adapted to transmit the modulated signals. In this manner, the demultiplexer 130 need not be located proximate to the spatial light modulator 120, and thus the image and spectral information can be analyzed down-stream. For example, in connection with endoscopy, the spatial light modulator 120 can be located on a probe and coupled to an optical fiber. One of ordinary skill in the art will appreciate that the modulated signals can also be transmitted through each pixel, and that a variety of other configurations can be achieved, depending on the desired application.

The demultiplexer 130 can include a plurality of detectors, each detector corresponding to one of the plurality of optical frequencies. The demultiplexer can include, for example, a diffraction grating-based spectrometer. For purpose of illustration, and not limitation, detector j of the optical demultiplexer 130, corresponding to the optical frequency component $v_j$, can detect an intensity signal given by $\Sigma_{x,y}I(x,y,v_j,t) \cos(\omega(x,y) t)$, i.e., the sum over all signals (x,y) from the spatial light modulator, each encoded at a unique frequency $\omega(x,y)$.

In accordance with the disclosed subject matter, one or more processors 140 can apply a transform, such as a Fourier transform, to the sum of the intensity of the modulated signals to obtain each intensity coefficient $I(x,y,v_j,t)$ for each pixel at each frequency component. The full image $I(x,y,v_j,t)$ can thus be recovered with reduced loss of optical intensity due to the modulation at $\cos(\omega(x,y) t)$. The disclosed subject matter can therefore provide for the recording of the entire relevant optical spectrum for every point (x,y) of a scene, instantaneously. Although processors 140 are depicted in FIG. 1 as separate from spectrometer 130, one of skill in the art will appreciate that a single device can alternatively include both a demultiplexer and one or more processors 140.

Figure 3:
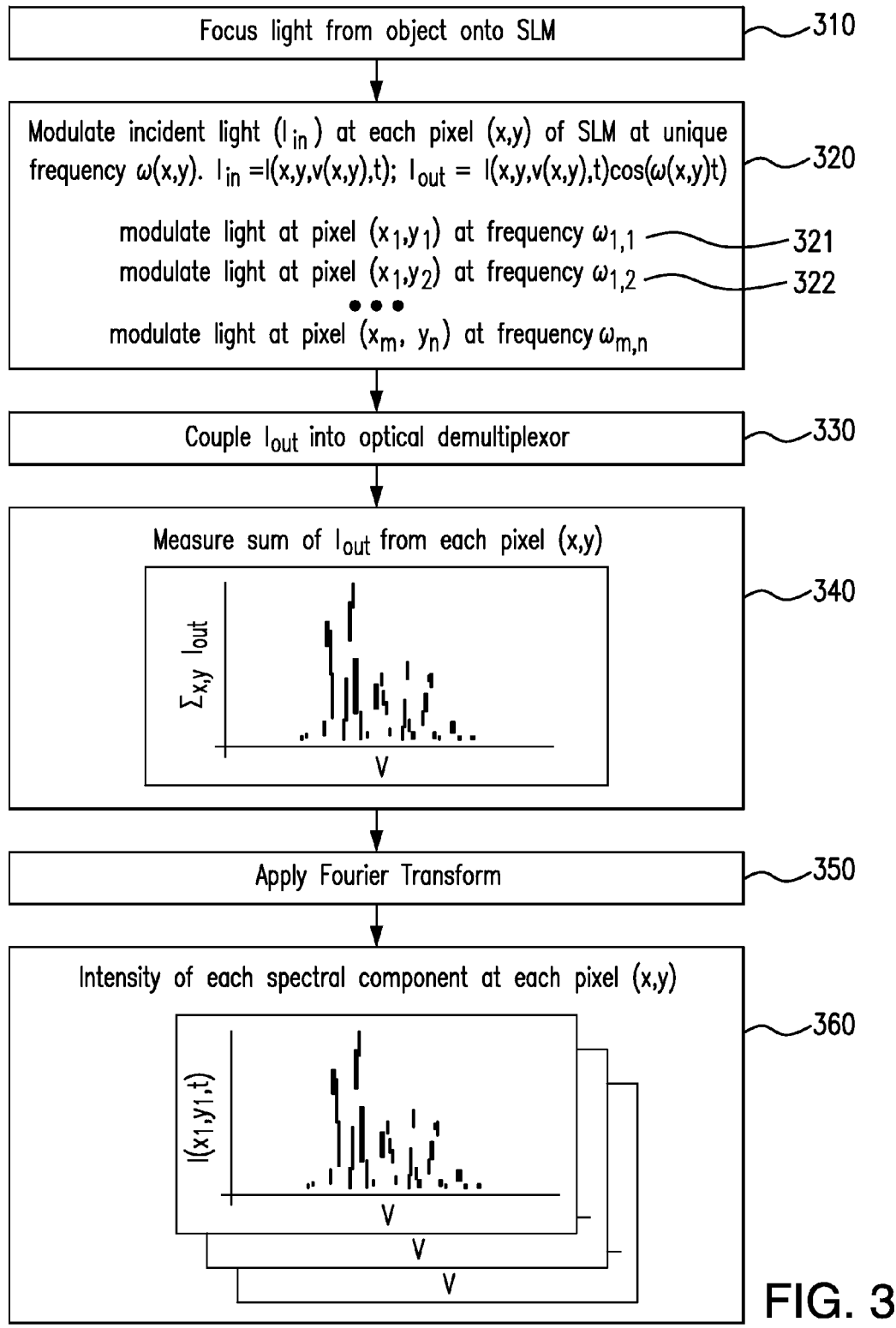
FIG. 3 is a flow chart of a method for hyperspectral imaging in accordance with an exemplary embodiment of the disclosed subject matter.

With reference to FIG. 3, and in accordance with an exemplary embodiment of the disclosed subject matter, a method for hyperspectral imaging can include projecting an image of a scene onto a spatial light modulator (310) having a plurality of pixels. The spatial light modulator can include encoding (321) electromagnetic radiation incident a first pixel at a first location into a first modulated signal having a first modulation frequency. The method further includes encoding (322) at least electromagnetic radiation incident a second pixel at a second location into a second modulated signal having a second modulation frequency, the first modulation frequency being different than the second modulation frequency. At least the first modulated signal and the second modulated signal can be coupled (330) into an optical demultiplexer and a sum of intensities of at least the first modulated signal and the second modulated signal can be measured (340) at a plurality of optical frequencies. A transform can be applied (350), with one or more processors, to the sum to obtain (360) an intensity of electromagnetic radiation incident each of the first location and the second location for each of the plurality of optical frequencies.

A method for hyperspectral imaging in accordance with an exemplary embodiment can include encoding, at each of the plurality of pixels given by, (x,y), electromagnetic radiation incident thereon via amplitude modulation of the form $\cos(\omega(x,y) t)$, wherein $\omega(x,y)$ is different for each pixel, (x,y). The sum of the modulated signals for each frequency component $v_j$, $\Sigma_{x,y} I(x,y,v_j,t) \cos(\omega(x,y) t)$, can be measured with each of a plurality of detectors, j, of the demultiplexer, each detector corresponding to an optical frequency component $v_j$. A Fourier transform can be applied to obtain each intensity coefficient $I(x,y,v_j,t)$ at each pixel (x,y) for each optical frequency component $v_j$.

For purpose of illustration and not limitation, the operating characteristics of an exemplary embodiment will be described. One of skill in the art will appreciate, however, that a variety of other operating conditions are suitable depending on the desired application. By way of notation, let d be the dimension of the space of (x,y)—e.g., modern cameras have d of several megapixels. Let $\omega(x,y)$ have values equally distributed from $\omega_{min}$ to $\omega_{max}$. The maximum bandwidth per spectral component $\omega(x,y)$ can thus be given by $\delta\omega=(\omega_{max}-\omega_{max})/d$. In this non-limiting embodiment, pixel (x,y) can be updated at most at frequency $\delta\omega$, and therefore $\delta\omega/2\pi$ can also limit the image acquisition rate (the frame rate). For example, if $d=10^6$ and $\omega_{max}/2\pi=10^8$ Hz, $\omega_{min}/2\pi=10^7$ Hz, then $\delta\omega/2\pi\sim 90$ Hz.

The subject matter disclosed herein can provide for ultra-compact, efficient, table, high-resolution hyperspectral imaging. Moreover, the techniques disclosed herein can provide for nearly loss-less compression of data and optical transmission. The disclosed subject matter provides for acquisition of a full two-dimensional spatial plane, together with a full spectrum at each point with high signal strength and acquisition speed.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the disclosed subject matter.

The invention claimed is:

1. A system for hyperspectral imaging, comprising:
   a spatial light modulator having a plurality of pixels, including a first pixel at a first location adapted to encode electromagnetic radiation incident the first location into a first modulated signal having a first modulation frequency, and at least a second pixel at a second location adapted to encode electromagnetic radiation incident the second location into a second modulated signal having a second modulation frequency, wherein the first modulation frequency is different from the second modulation frequency;
   an optical demultiplexer;
   one or more optical elements arranged to couple at least the first modulated signal and the second modulated signal into the demultiplexer, the demultiplexer adapted to measure a sum of intensities of at least the first modulated signal and the second modulated signal at a plurality of optical frequencies; and
   one or more processors, operatively coupled to the demultiplexer, configured to apply a Fourier transform to the sum of intensities of the first modulated signal and the second modulated signal at the plurality of optical frequencies and obtain an intensity coefficient of electromagnetic radiation incident each of the first location and the second location for each of the plurality of optical frequencies.

2. The system of claim 1, further comprising one or more optical elements for focusing electromagnetic radiation from an object to be imaged onto the spatial light modulator.

3. The system of claim 1, wherein the spatial light modulator is adapted to encode electromagnetic radiation incident on each of the plurality of pixels using one or more of electro-optic modulation, acousto-optic modulation, magneto-optic modulation, or opto-mechanic modulation.

4. The system of claim 1, wherein the spatial light modulator comprises a digital micromirror device, wherein each of the plurality of pixels includes one or more mirrors coupled to a control unit adapted to cause electrostatic actuation thereof, such that the first pixel is electrostatically actuated at the first modulation frequency and the second pixel is electrostatically actuated at the second modulation frequency.

5. The system of claim 1, wherein the plurality of pixels of the spatial light modulator are arranged in a two dimensional array.

6. The system of claim 1, wherein the one or more optical elements include a multi-mode fiber adapted to transmit at least the first modulated signal and the second modulated signal to the optical demultiplexer.

7. The system of claim 1, wherein the demultiplexer includes plurality of detectors, each detector corresponding to one of the plurality of optical frequencies.

8. The system of claim 7, wherein the demultiplexer includes a diffraction grating-based spectrometer.

9. The system of claim 7, wherein each of the plurality of pixels given by (x,y) is adapted to encode electromagnetic radiation incident thereon via amplitude modulation of the form $\cos(\omega(x,y)t)$, wherein $\omega(x,y)$ is different for each pixel, (x,y);
   wherein each of the plurality of detectors, j, of the demultiplexer corresponds to an optical frequency component $v_j$, each detector adapted to measure the sum, $\Sigma_{x,y} I_j(x,y,v_j,t) \cos(\omega(x,y)t)$, of modulated signals from each of the plurality of pixels at the corresponding optical frequency component; and
   wherein the one or more processors are configured to apply the Fourier transform to obtain each intensity coefficient $I(x,y,v_j,t)$ at each pixel (x,y) for each optical frequency component $v_j$.

10. A method for hyperspectral imaging using a spatial light modulator having a plurality of pixels, comprising:
    encoding electromagnetic radiation incident a first pixel at a first location into a first modulated signal having a first modulation frequency;
    encoding electromagnetic radiation incident a second pixel at a second location into a second modulated signal having a second modulation frequency, the first modulation frequency being different than the second modulation frequency;
    measuring a sum of intensities of at least the first modulated signal and the second modulated signal at a plurality of optical frequencies; and
    applying, with one or more processors, a Fourier transform to the sum of intensities of the first modulated signal and the second modulated at the plurality of optical frequencies to obtain an intensity coefficient of electromagnetic radiation incident each of the first location and the second location for each of the plurality of optical frequencies.

11. The method of claim 10, further comprising encoding electromagnetic radiation incident each of the plurality of pixels using one or more of electro-optic modulation, acousto-optic modulation, magneto-optic modulation, or opto-mechanic modulation.

12. The method of claim 10, wherein encoding the electromagnetic radiation incident the first pixel comprises electrostatically actuating one or more mirrors at the first modulation frequency and wherein encoding the electromagnetic radiation incident the second pixel comprises electrostatically actuating one or more minors at the second modulation frequency.

13. The method of claim 10, wherein the plurality of pixels of the spatial light modulator are arranged in a two dimensional array.

14. The method of claim 13, further comprising encoding, at each of the plurality of pixels given, (x,y), electromagnetic radiation incident thereon via amplitude modulation of the form $\cos(\omega(x,y)t)$, wherein $\omega(x,y)$ is different for each pixel, (x,y);

measuring, with each of the plurality of detectors, j, of the demultiplexer, each detector corresponding to an optical frequency component $v_j$, the sum, $\Sigma_{x,y} I(x,y,v_j,t) \cos(\omega(x,y)t)$, of modulated signals from each of the plurality of pixels at the corresponding optical frequency component; and applying, with the one or more processors, the Fourier transform to obtain each intensity coefficient $I(x,y,v_j,t)$ at each pixel (x,y) for each optical frequency component $v_j$.

\* \* \* \* \*